United States Patent
Takashima

(10) Patent No.: US 8,645,452 B2
(45) Date of Patent: Feb. 4, 2014

(54) IN-VEHICLE COMMUNICATION SYSTEM

(75) Inventor: Ako Takashima, Yokkaichi (JP)

(73) Assignees: Autonetworks Technologies, Ltd., Mie (JP); Sumitomo Wiring Systems, Ltd., Mie (JP); Sumitomo Electric Industries, Ltd., Osaka (JP)

( * ) Notice: Subject to any disclaimer, the term of this patent is extended or adjusted under 35 U.S.C. 154(b) by 591 days.

(21) Appl. No.: 12/452,392

(22) PCT Filed: Jul. 31, 2008

(86) PCT No.: PCT/JP2008/063740
§ 371 (c)(1),
(2), (4) Date: Dec. 29, 2009

(87) PCT Pub. No.: WO2009/020036
PCT Pub. Date: Feb. 12, 2009

(65) Prior Publication Data
US 2010/0138472 A1 Jun. 3, 2010

(30) Foreign Application Priority Data
Aug. 3, 2007 (JP) ................. 2007-203045

(51) Int. Cl.
*G06F 15/16* (2006.01)
*G06F 7/00* (2006.01)

(52) U.S. Cl.
USPC .............. 709/201; 709/218; 709/223; 701/1; 701/32.7

(58) Field of Classification Search
USPC ............. 709/201–203, 217–229; 701/1, 32.7, 701/3.1
See application file for complete search history.

(56) References Cited

U.S. PATENT DOCUMENTS

| 6,411,985 B1 | 6/2002 | Fujita et al. | |
|---|---|---|---|
| 2003/0120844 A1* | 6/2003 | Hamel | 710/72 |
| 2003/0171852 A1 | 9/2003 | Vollmer et al. | |
| 2004/0015249 A1* | 1/2004 | Izumi et al. | 700/94 |
| 2007/0083304 A1* | 4/2007 | Yamada | 701/29 |
| 2007/0213888 A1* | 9/2007 | Shidai et al. | 701/1 |

FOREIGN PATENT DOCUMENTS

| DE | 100 22 422 A1 | 11/2001 |
|---|---|---|
| JP | A-07-306828 | 11/1995 |
| JP | A-2003-087231 | 3/2003 |
| JP | A-2003-249906 | 9/2003 |
| JP | A-2005-159568 | 6/2005 |

OTHER PUBLICATIONS

International Search Report issued in International Patent Application No. PCT/JP2008/063740 on Sep. 9, 2008.

(Continued)

*Primary Examiner* — Yasin Barqadle
(74) *Attorney, Agent, or Firm* — Oliff PLC

(57) ABSTRACT

A control section of a distribution apparatus decides whether data included in message has been stored by own DB or not, when distributing the message to an onboard apparatus based on transmitted information registered by second transmitted information table. From own DB, the control section of the distribution apparatus reads out data having been stored by the DB. For data that has not been stored by own DB, the control section of the distribution apparatus identifies another distribution apparatus having stored this data, and obtains this data from the identified another distribution apparatus. The control section of the distribution apparatus creates message including the data read out from own DB and the obtained data, and transmits the created message to an onboard apparatus which is a destination.

17 Claims, 10 Drawing Sheets

(56) References Cited

OTHER PUBLICATIONS

Dec. 2, 2011 German Office Action issued in Patent Application No. 11 2008 002 092.2 (with translation).

Notification of Reasons for Rejection dated Aug. 14, 2012 from Japanese Patent Application No. 2007-203045 (with English-language translation).

* cited by examiner

FIG. 3A

| DATA ID | DATA VALUE |
|---------|------------|
| 1 | DATA1 |
| 2 | DATA2 |
| 3 | DATA3 |
| ⋮ | ⋮ |

FIG. 3B

| DATA ID | APPARATUS INFORMATION |
|---------|----------------------|
| 1 | 2a |
| 2 | 2a |
| ⋮ | ⋮ |
| 101 | 2b |
| 102 | 2b |
| ⋮ | ⋮ |
| 201 | 2c |
| 202 | 2c |
| ⋮ | ⋮ |

FIG. 4A

| DATA ID | DISTRIBUTION INTERVAL (msec) | DESTINATION |
|---|---|---|
| 1 | T1 | 1a |
| 2 | T2 | 1b |
| 3 | T3 | 1b |

FIG. 4B

| MESSAGE ID | DISTRIBUTION INTERVAL (msec) | DESTINATION | DATA INFORMATION | |
|---|---|---|---|---|
| | | | POSITION | DATA ID |
| 1 | T4 | 1a | FIRST BYTE | 1 |
| | | | SECOND BYTE | 101 |
| | | | THIRD BYTE | 201 |

FIG. 7A

| MESSAGE ID | DISTRIBUTION INTERVAL (msec) | DESTINATION | DATA INFORMATION | |
|---|---|---|---|---|
| | | | POSITION | DATA ID |
| 1 | T4 | 2a | THIRD BYTE | 201 |

FIG. 7B

| MESSAGE ID | DESTINATION | DATA INFORMATION | |
|---|---|---|---|
| | | POSITION | DATA ID |
| 1 | 2a | SECOND BYTE | 101 |

FIG. 7C

| MESSAGE ID | DESTINATION | DATA INFORMATION | |
|---|---|---|---|
| | | POSITION | DATA ID |
| 1 | 1a | FIRST BYTE | 1 |

IN-VEHICLE COMMUNICATION SYSTEM

This application is the national phase under 35 U.S.C. §371 of PCT International Application No. PCT/JP2008/063740 which has an International filing date of Jul. 31, 2008 and designated the United States of America.

BACKGROUND OF THE INVENTION

1. Field of the Invention

The present invention relates to an in-vehicle communication system comprising a plurality of distribution apparatuses for distributing stored data and an onboard apparatus for receiving data distributed from the distribution apparatuses.

2. Description of Related Art

Recently, there are an increasing number of onboard instruments, as well as operation assistant functions, mounted on a car (motor vehicle). In proportion to the increasing numbers, a car tends to have an increasing number and an increasing number of types of ECUs (Electronic Control Units) that control electrically onboard instruments and operation assistant functions. Furthermore, in proportion to the increasing number of ECUs, data amounts are increased that are sent and received through a communication line within the car to which ECUs are connected.

It is common for such communication line within a car that ECUs are connected in a bus topology to a serial bus based on CAN (Controller Area Network) and the like. Thus, data is sent to all ECUs connected to the same communication line within the car, even when the data is utilized only by some ECUs. Therefore, data collision is caused by the increasing amounts of data sent and received in the communication line within the car, and then data delay or data deletion is caused by the data collision. A noticeable data delay or data deletion may happen to lead a critical defect for an operation assist function controlled by an ECU, such as a function for brake control.

Hence, it is common that a communication line within a car is branched into a plurality of communication lines and ECUs are connected to the communication lines suitably, because it is possible to minimize waste of usage about a communication line within a car by holding ECUs based on common data. In addition, it is known to categorize ECUs into groups based on types of sent and received data, and then to suitably connect the groups to communication lines within a car having different communication speeds, in order to utilize the communication lines efficiently in consideration of an increasing number of types of ECUs. In these configurations, a gateway apparatus is utilized to connect different communication lines within a car to each other, and the gateway apparatus controls to send and receive data. Thus, the gateway apparatus functions as a distribution apparatus that temporally stores data received from an ECU and distributes/sends the stored data to an onboard apparatus which requires the stored data.

A patent document 1 discloses a technique: to separate ECUs into a plurality of groups; connect ECUs to a communication line per the groups; further connect the communication line to a gateway apparatus; add priority information to received and sent data for identifying a priority level; determine a priority level based on priority information of received data, when the gateway apparatus sends or receives data between different communication lines within a car; and to preferentially send data having the highest priority level in order to prevent a noticeable delay in a transmission of data having a higher priority level. [Patent document 1] Japanese Patent Application Laid-Open No. 2005-159568

SUMMARY OF THE INVENTION

However, in a conventional in-vehicle communication system, each onboard apparatus obtains required data from a gateway apparatus connected to itself. Thus, it is difficult to obtain data for an onboard apparatus when the data is not stored by the gateway apparatus. Further, it is hard for each onboard apparatus in the patent document 1 to obtain data having been stored by any of gateway apparatuses included in the in-vehicle communication system, because the patent document 1 is intended for preventing a noticeable delay with preferentially sending data having the highest priority level in a case of a high communication load.

It may be considered that a gateway apparatus stores all data required by all motor-vehicle connected to the gateway apparatus. However, this configuration leads huge amounts of data to be stored by the gateway apparatus. Thus, this configuration is not practical.

The present invention is made in view of such circumstances and has a primary object to provide an in-vehicle communication system that can prevent increasing amounts of data to be stored by a distribution apparatus and can make a distribution apparatus efficiently distribute data required by an onboard apparatus.

Another object of the present invention is to provide an in-vehicle communication system that can reduce amounts of data sent and received in the system to reduce communication load, and can distribute data as needed from a distribution apparatus to an onboard apparatus even when the data is not distributed from the distribution apparatus to the onboard apparatus during a normal operation of the system.

An in-vehicle communication system according to the present invention comprises: a plurality of distribution apparatuses having a storage means for storing data and a means for distributing stored data; and an onboard apparatuses receiving data distributed by the distribution apparatus, wherein each of the distribution apparatuses comprises: a decision means for deciding when distributing data to the onboard apparatus whether data to be distributed has been stored by own storage means or not; a means for reading out the data from own storage means when it is decided that data to be distributed has been stored by own storage means; a request means for requesting the data to another distribution apparatus whose storage means has stored the data, when it is decided that data to be distributed has not been stored by own storage means; and a means for receiving the data from said another distribution apparatus, and data being read out from own storage means and/or data received from said another distribution apparatus are configured to be distributed to the onboard apparatus.

According to the present invention, a distribution apparatus decides whether data to be distributed has been stored by own storage means or not when distributing the data to be distributed to an onboard apparatus. The distribution apparatus reads out data from own storage means when the data has been stored by the own storage means. The distribution apparatus sends a request to another distribution apparatus having stored data in order to receive the data when requiring the data having been stored by said another distribution apparatus. Thus, the distribution apparatus distributes the data being read out from own storage means and/or the data received from said another distribution apparatus to an onboard apparatus.

In an in-vehicle communication system according to the present invention, the onboard apparatus comprises a means for sending a data transmission request to the distribution apparatus, and the decision means of the distribution apparatus is configured to decide on the basis of a received data transmission request whether data to be distributed has been stored by own storage means or not, when the data transmission request is received from the onboard apparatus.

According to the present invention, a distribution apparatus decides on the basis of a received data transmission request whether data to be distributed has been stored by own storage means or not, when an onboard apparatus sends the data transmission request to the distribution apparatus. Thus, the distribution apparatus reads out data from own storage means when the data has been stored by the own storage means. The distribution apparatus sends a request to another distribution apparatus storing data in order to receive the data when requiring the data having been stored by said another distribution apparatus. Hence, the distribution apparatus distributes the data being read out from own storage means and/or the data received from said another distribution apparatus to an onboard apparatus.

In an in-vehicle communication system according to the present invention, the distribution apparatus comprises: an apparatus information storage means for storing, in association with each other, information for identifying data and information that represents a distribution apparatus whose storage means has stored the data; and a means for identifying a distribution apparatus whose storage means has stored the data on the basis of storage contents of the apparatus information storage means, when it is decided that data to be distributed has not been stored by own storage means, and the request means is configured to request a transmission of the data to the identified distribution apparatus.

According to the present invention, the distribution apparatus comprises an apparatus information storage means for storing, in association with each other, information that is utilized for identifying data and information that represents a distribution apparatus whose storage means has stored the data. When having decided that data to be distributed has not been stored by own storage means, the distribution apparatus identifies another distribution apparatus that has stored this data on the basis of contents stored by the apparatus information storage means, and requests about the data to the identified distribution apparatus. The distribution apparatus then distributes data received from said another distribution apparatus to an onboard apparatus.

An in-vehicle communication system according to the present invention comprises: a plurality of distribution apparatuses having a storage means for storing data and a means for distributing stored data; and an onboard apparatus receiving data distributed from the distribution apparatus, wherein the distribution apparatus comprises: a distribution information storage means for storing, in association with each other, information that identifies data, distribution information that is added when the data is distributed, and information that represents a destination; and a means for adding distribution information stored by the distribution information storage means in association with data to the data, when the data having been stored by the distribution information storage means is distributed, the data to which the distribution information is added is configured to be distributed in accordance with the data to a destination stored by the distribution information storage means, and data stored by the distribution information storage means in association with the distribution information is configured to be added to received data and distributed to a destination stored by the distribution information storage means in association with the distribution information, when the data is received to which the distribution information is added.

According to the present invention, the distribution apparatus comprises a distribution information storage means for storing, in association with one another, information that is utilized for identifying data, distribution information that is added when the data is distributed, and information that represents a destination. The distribution apparatus adds corresponding distribution information to data to be distributed, when distributing the data to be distributed. The distribution apparatus then distributes, to a corresponding destination, the data to be distributed with added distribution information. In addition, when receiving data having such added distribution information, the distribution apparatus adds data corresponding to this added distribution information onto the receiving data. The distribution apparatus then distributes, to a destination corresponding to this added distribution information, the receiving data having such data corresponding to this added distribution information.

In an in-vehicle communication system according to the present invention, the destination is an onboard apparatus or another distribution apparatus.

According to the present invention, a destination to which data should be distributed by the distribution apparatus is an onboard apparatus or another distribution apparatus. After receiving data with added distribution information from another distribution apparatus, the distribution apparatus adds data corresponding to the distribution information onto the receiving data, and then distributes to an onboard apparatus or another distribution apparatus that is a destination previously stored in association with the distribution information.

In an in-vehicle communication system according to the present invention, the onboard apparatus comprises a means for sending a data transmission request to the distribution apparatus, and the distribution apparatus comprises a means for storing onto the destination storage means, in association with one another, information that identifies data to be distributed, additional information that is added when the data is distributed, and information that represents about destination, on the basis of a received transmission request.

According to the present invention, when an onboard apparatus sends a data transmission request to a distribution apparatus, the distribution apparatus stores identification information for identifying data to be distributed, distribution information that is added when the data is distributed and information that represents about destination, on the basis of a receiving transmission request, onto a destination storage means.

In an aspect of the present invention, a distribution apparatus reads out data to be distributed from own storage means and distributes to an onboard apparatus, in a case that there is the data to be distributed which has been stored by the own storage means when the distribution apparatus tries to distribute the data to be distributed to the onboard apparatus. On the other hand, the distribution apparatus receives data to be distributed from another distribution apparatus and distributes to the onboard apparatus, in a case that there is not the data to be distributed which has been stored by the own storage means when the distribution apparatus tries to distribute the data to be distributed to the onboard apparatus. Thus, the distribution apparatus does not require to store all data that are utilized by own connected onboard apparatus. Therefore, it is possible to reduce amounts of data which should be stored by each distribution apparatus. Furthermore, the onboard apparatus can obtain all required data from the distribution apparatuses connected to the onboard apparatus. Therefore, it is possible to obtain data efficiently.

In an aspect of the present invention, a distribution apparatus receives data from another distribution apparatus, as needed, on the basis of a transmission request from an onboard apparatus. Thus, it is possible to reduce amounts of data transmitted among distribution apparatuses. Therefore, it is possible to reduce communication loads in a system. Furthermore, data can be distributed as needed from a distribution apparatus to an onboard apparatus, even when the data is not transmitted during a normal operation of a system, such as data that is required to be transmitted in response to an operation based on an instruction of a passenger in a car.

In an aspect of the present invention, a distribution apparatus knows in advance what data another distribution has stored. Thus, the distribution apparatus can easily identify another distribution apparatus that has storied data to be distributed, when requiring a reception of data to be distributed to an onboard apparatus from said another distribution apparatus. Therefore, the distribution apparatus can reliably distribute data corresponding to a transmission request from the onboard apparatus.

In an aspect of the present invention, it is possible to add distribution information for identifying each data transmitted among distribution apparatuses or between a distribution apparatus and an onboard apparatus. Thus, each data can be identified with the distribution information. Hence, each distribution apparatus can sequentially add own storing data based on the distribution information that is added onto data distributed by another distribution apparatus. Therefore, an onboard apparatus can obtain all required data because receiving data distributed from distribution apparatuses.

In an aspect of the present invention, it is possible to reduce amounts of data transmitted among distribution apparatuses or between a distribution apparatus and an onboard apparatus, by previously setting distribution paths, among a plurality of distribution apparatuses having stored data required by an onboard apparatus, which are for efficiently distributing data from a distribution apparatus to an onboard apparatus, in consideration of connection conditions of distribution apparatuses.

In an aspect of the present invention, a distribution apparatus can distribute as needed, on the basis of a transmission request from an onboard apparatus, data that is not transmitted between a distribution apparatus and an onboard apparatus during a normal operation of a system, by registering distribution information added when distributing data to be distributed and destinations in association with one another.

The above and further objects and features of the invention will more fully be apparent from the following detailed description with accompanying drawings.

BRIEF DESCRIPTION OF THE DRAWINGS

FIG. 3A and FIG. 3B are schematic views showing registration contents of DB and a management information table;

FIG. 4A and FIG. 4B are schematic views showing registration contents of first transmitted information table and second transmitted information table;

FIG. 7A, FIG. 7B and FIG. 7C are schematic views showing registration contents of second transmitted information table and relay information tables;

| EXPLANATIONS OF ITEM NUMBERS | |
|---|---|
| 1a, 1b, 1c, 1d, 1e | onboard apparatus |
| 2a, 2b, 2c | distribution apparatus |
| 21a, 21b, 21c | DB (storage means) |
| 3a, 3b, 3c | communication line within a car |

DESCRIPTION OF THE PREFERRED EMBODIMENTS

Embodiment 1

Figure 1:
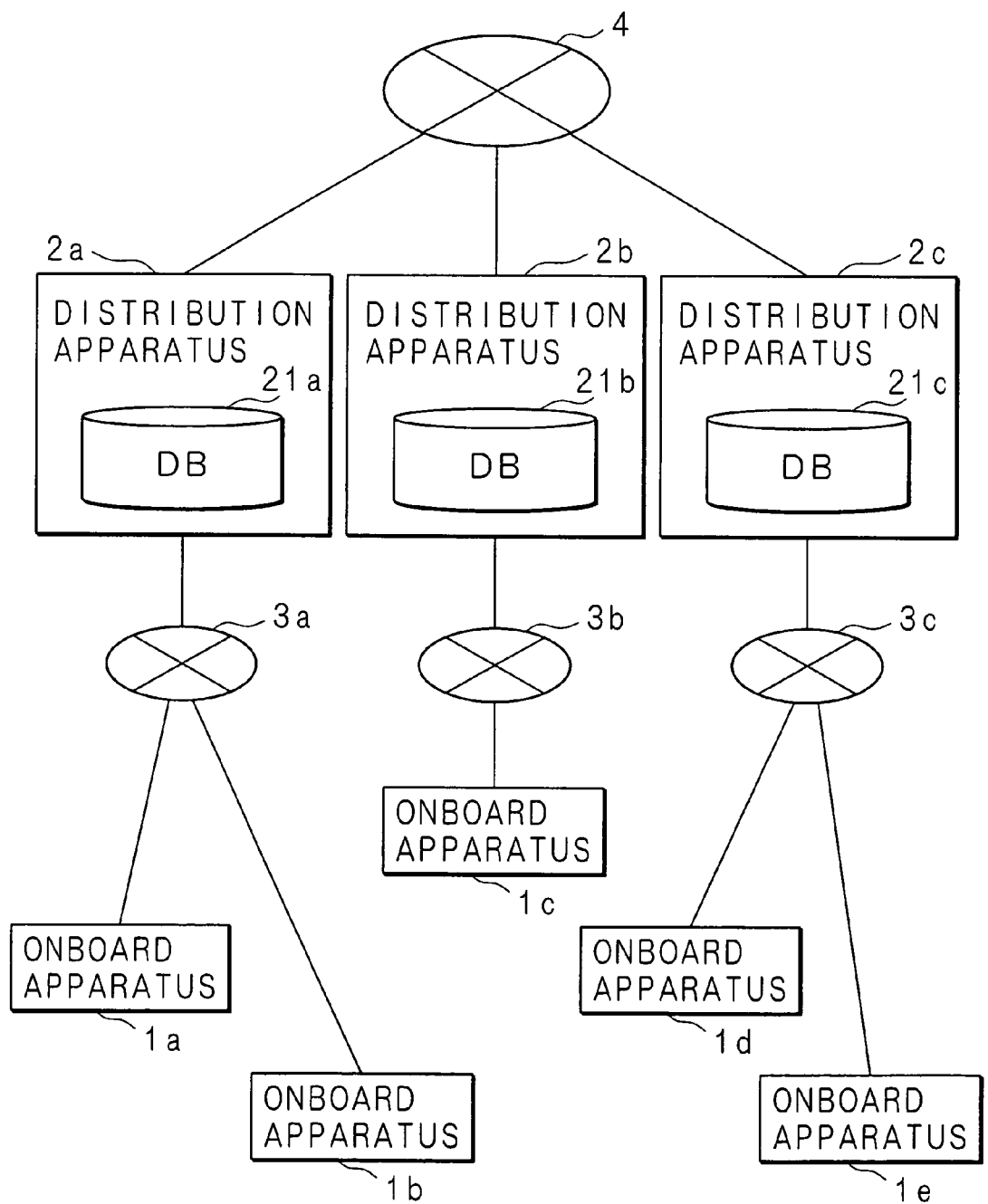
FIG. 1 is a block diagram showing a configuration of an in-vehicle communication system according to the present invention.

Hereinafter, an in-vehicle communication system according to the present invention is described in detail with reference to drawings illustrating an in-vehicle communication system in Embodiment 1. FIG. 1 is a block diagram showing a configuration of an in-vehicle communication system according to the present invention. The in-vehicle communication system according to the present invention includes: a plurality of onboard apparatuses 1a, 1b, 1c, 1d, 1e each of which utilizes an electronic control unit (ECU); a communication line within a car 3a connecting to the onboard apparatuses 1a, 1b; a communication line within the car 3b connecting to the onboard apparatus 1c; a communication line within the car 3c connecting to the onboard apparatuses 1d, 1e; distribution apparatuses 2a, 2b, 2c respectively connected to the communication lines within the car 3a, 3b, 3c; and a communication line 4 connecting the distribution apparatuses 2a, 2b, 2c to one another.

Although the embodiment 1 is illustrated on the basis of a configuration shown in FIG. 1, it should be noted that the present invention is not limited to the numbers of the onboard apparatuses, distribution apparatuses and the communication lines within the car. In addition, although each of the onboard apparatuses 1a, 1b, 1c, 1d, 1e is connected to any one of communication lines within the car 3a, 3b, 3c, each of the onboard apparatuses 1a, 1b, 1c, 1d, 1e may be connected to no less than single communication line within the car 3a, 3b, 3c.

The onboard apparatuses 1a, 1b are respectively connected to the communication line within the car 3a in a bus topology manner. Data transmitted to the communication line within the car 3a is commonly received by the onboard apparatuses 1a, 1b and the distribution apparatus 2a that are connected to the communication line within the car 3a. The onboard apparatus 1c is connected to the communication line within the car 3b in the bus topology manner. Data transmitted to the communication line within the car 3b is commonly received by the onboard apparatus 1c and the distribution apparatus 2b that are connected to the communication line within the car 3b. The onboard apparatuses 1d, 1e are respectively connected to the communication line within the car 3c in the bus topology manner. Data transmitted to the communication line within the car 3c is commonly received by the onboard apparatuses 1d, 1e and the distribution apparatus 2c that are connected to the communication line within the car 3c.

The communication lines within the car 3a, 3b, 3c are based on a protocol, e.g., CAN. The onboard apparatuses 1a, 1b, 1c, 1d, 1e can send and receive data via the communication lines within the car 3a, 3b, 2c, by generating or detecting a signal based on CAN. It should be noted that the in-vehicle communication system according to the present invention is not limited to utilize the communication lines within the car 3a, 3b, 3c described above. For example, the in-vehicle communication system according to the present invention may be configured to utilize a protocol based on LIN (Local Interconnect Network), Flex Ray (registered trademark) or the like, in order to implement data sending and data receiving. Furthermore, the in-vehicle communication system according to the present invention may be configured to utilize the communication lines within the car 3a, 3b, 3c having different speed based on types of sending and receiving data.

The onboard apparatuses 1a, 1b, 1c, 1d, 1e utilize ECUs and can send and receive data about numerical information (data values) of several physical quantities, e.g., measured values: such as temperature, angle and speed detected by a connected sensor (not shown); computed values obtained by calculations; control values and the like. In addition, the onboard apparatuses 1a, 1b, 1c, 1d, 1e can control an engine, brake and the like, with utilizing a microcomputer. For example, one onboard apparatus 1a is connected to a sensor for detecting speed of the car, and data including data values about the speed detected by the sensor is sent to the distribution apparatus 2a.

In a case of CAN, an ID (identifier) is allocated to each physical quantity. Thus, the data transmitted between the onboard apparatuses 1a, 1b, 1c, 1d, 1e and the distribution apparatuses 2a, 2b, 2c in the embodiment 1 includes data ID allocated to a physical quantity and the measured values (data values) corresponding to the physical quantity. The onboard apparatuses 1a, 1b, 1c, 1d, 1e and the distribution apparatuses 2a, 2b, 2c can decide, on the basis of data ID included in data transmitted from any of the onboard apparatuses 1a, 1b, 1c, 1d, 1e and the distribution apparatuses 2a, 2b, 2c, what kind of physical values data values being included in the transmitted data is for.

The distribution apparatuses 2a, 2b, 2c includes storage regions utilized as databases (DBs) 21a, 21b, 21c, respectively. The distribution apparatuses 2a, 2b, 2c receive data sent from own connected onboard apparatuses 1a, 1b, 1c, 1d, 1e, store on the DBs (storage means) 21a, 21b, 21c, and distribute to own connected onboard apparatuses 1a, 1b, 1c, 1d, 1e.

The distribution apparatuses 2a, 2b, 2c are connected to one another with the communication line 4, and can transmit and receive data mutually. In the embodiment 1, it is illustrated to utilize a packet switching network for configuring the communication line 4. However, the present invention is not limited to this configuration described above. The communication line 4 may be able to transmit data between the distribution apparatuses 2a, 2b, 2c, for example, with utilizing a communication line based on CAN in order to function as an onboard apparatus communication system connecting the distribution apparatuses 2a, 2b, 2c to one another.

In addition, the present invention may utilize any topology, such as a bus topology, star topology and a daisy topology, for configuring the communication line within the car 3a connecting the onboard apparatuses 1a, 1b to the distribution apparatus 2a, the communication line within the car 3b connecting the onboard apparatus 1c to the distribution apparatus 2b, communication line within the car 3c connecting the onboard apparatuses 1d, 1e to the distribution apparatus 2c and the communication line 4 connecting the distribution apparatuses 2a, 2b, 2c to one another.

The distribution apparatuses 2a, 2b, 2c may be connected to other onboard apparatuses (not shown) via another communication lines within the car (not shown), and may transmit data received from own connected onboard apparatuses 1a, 1b, 1c, 1d, 1e to other onboard apparatuses. In this case, it is possible to reduce communication loads in the in-vehicle communication system, by reading out only required data by said other onboard apparatuses from DBs 21a, 21b, 21c to transmit to said other onboard apparatuses, rather than all data being sent from the onboard apparatuses 1a, 1b, 1c, 1d, 1e.

Figure 2:
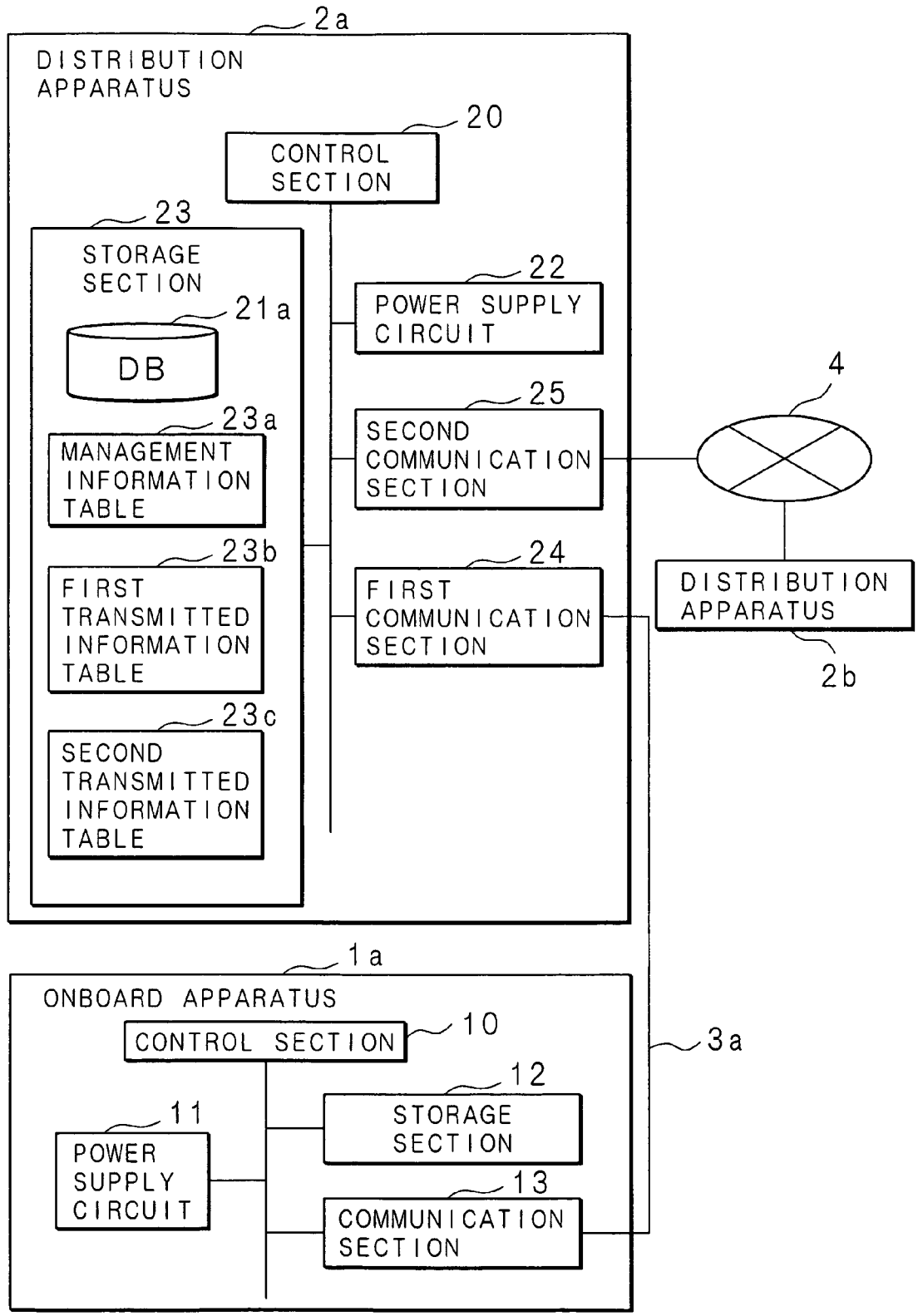
FIG. 2 is a block diagram showing inner components of an onboard apparatus and a distribution apparatus configuring the in-vehicle communication system according to the present invention.

FIG. 2 is a block diagram showing inner components of the onboard apparatus 1a and the distribution apparatus 2a configuring the in-vehicle communication system according to the present invention. The onboard apparatuses 1b, 1c, 1d, 1e have similar inner components to those of the onboard apparatus 1a. Thus, the configurations of the onboard apparatuses 1b, 1c, 1d, 1e will not be described in detail. In addition, the distribution apparatuses 2b, 2c have similar inner components to those of the distribution apparatus 2a. Thus, the configurations of the distribution apparatuses 2b, 2c will not be described in detail.

The onboard apparatus 1a includes: a control section 10 that controls operations of each component described below; power supply circuit 11 that supplies power to each component; storage section 12 that consists of a volatile memory, such as DRAM (Dynamic Random Access Memory); and a communication section 13 that controls communications with the communication line within the car 3a. It may be configured to have an onboard apparatus connected to a plurality of distribution apparatuses via a plurality of communication lines within the car. In this configuration, the onboard apparatus may include the same numbers of communication sections as those of communication lines within the car.

The control section 10 of the onboard apparatus 1a is supplied with power through the power supply circuit 11 by a power supply apparatus (not shown), such as an alternator and a battery of the car, reads out program stored by the storage section 12, executes the read program and controls operations of each component.

The storage section 12 of the onboard apparatus 1a stores, in advance, several types of control program to make the onboard apparatus 1a function as the onboard apparatus of the in-vehicle communication system according to the present invention. In addition, the storage section 12 temporally stores various information, such as control values and measured values, which are generated during processes of the control section 10. Additionally, the storage section 12 stores data ID that is allocated to each physical value sent from the onboard apparatus 1a to the distribution apparatus 2a via the communication line within the car 3a and that is utilized for identifying each physical value. The storage section 12 contains a battery (not shown) to hold various information, while being a volatile memory.

The communication section 13 of the onboard apparatus 1a implements sending and receiving data with the distribution apparatus 2a that is connected to the onboard apparatus 1a via the communication line within the car 3a. The control section 10 of the onboard apparatus 1a obtains data values of various physical values by executing the control program stored by the storage section 12, and sends the obtained data, to which data ID stored by the storage section 12 has been added, from the communication section 13 to the distribution apparatus 2a at predetermined interval, e.g., 10 milliseconds.

The distribution apparatus 2a includes: a control section 20 that controls operations of each component described below; power supply circuit 22 that supplies power to each component; storage section 23 that consists of a volatile memory, such as DRAM; a first communication section 24 that controls communications with the communication line within the car 3a; and a second communication section 25 that controls communications with the communication line 4.

The control section 20 of the distribution apparatus 2a is supplied with power through the power supply circuit 22 by a power supply apparatus, such as a battery, reads out control program stored by the storage section 23, executes the read control program and controls operations of each component. Specifically, the control section 20 makes the DB 21a of the storage section 23 store, in association with one another, data ID and data values included into data received from the onboard apparatus 1a.

The first communication section 24 of the distribution apparatus 2a implements data transmission to and from the onboard apparatus 1a connected to the distribution apparatus 2a via the communication line within the car 3a. The second communication section 25 implements data transmission to and from the distribution apparatuses 2b, 2c connected to the distribution apparatus 2a via the communication line 4.

The storage section 23 of the distribution apparatus 2a stores, in advance, several types of control program to make the distribution apparatus 2a function as the distribution apparatus of the in-vehicle communication system according to the present invention. In addition, the storage section 23 temporally stores several types of information generated during processes of the control section 20. Additionally, the storage section 23 includes storage region for DB 21a as shown in FIG. 3A, and stores a management information table 23a as shown FIG. 3B, first transmitted information table 23b as shown in FIG. 4A and second transmitted information table 23c as shown in FIG. 4B. The storage section 23 contains a battery (not shown) to hold several types of information, while being a volatile memory.

FIG. 3A and FIG. 3B are schematic views showing registration contents of the DB 21a and the management information table 23a. FIG. 4A and FIG. 4B are schematic views showing registration contents of the first transmitted information table 23b and the second transmitted information table 23c. As shown in FIG. 3A, there are data ID for data received from the onboard apparatus 1a and the distribution apparatuses 2b, 2c by the control section 20 and data values for each data that are registered in association with one another in the DB 21a. As shown in FIG. 3B, there are data ID for each data and apparatus information for representing the distribution apparatuses 2a, 2b, 2c whose storage section 23 having stored each data, which are registered in association with one another in the management information table (apparatus information storage means) 23a. Specifically, numerals "2a", "2b" and "2c" are registered, as information for identifying each distribution apparatus 2a, 2b, 2c, in columns of the apparatus information included in the management information table 23a shown in FIG. 3B.

As shown in FIG. 4A, there are data ID for each data, distribution interval for distributing each data and a destination for each data, as transmitted information for each data transmitted from the distribution apparatus 2a to the onboard apparatus 1a, which are registered in association with one another in the first transmitted information table 23b. As shown in FIG. 4B, there are message ID for each message, distribution interval for distributing each message, a destination for each message and data information for representing data included in each message, as transmitted information for each message transmitted from the distribution apparatus 2a to the onboard apparatus 1a, which are registered in association with one another in the second transmitted information table 23c. In the transmitted information tables 23b, 23c shown in FIGS. 4A and 4B, numerals "1a" and "1b" are registered as information representing onboard apparatuses 1a, 1b selected as destinations in columns of destination. However, it is not limited to information representing the onboard apparatus for the information about the destination. It may be utilized information representing the communication line within the car for the information about the destination.

Further, there are each position in the message and data ID for each data included in the message, which are registered in data information columns of the second transmitted information table 23c in association with one another. Specifically, the position represents how many bytes away each data is from first byte, in a case that the message is 8 bytes of data. Thus, the message with message ID "1" registered in the second transmitted information table 23c shown in FIG. 4B is transmitted to a destination "1a" at distribution interval "T4" and includes data having data ID "1" at the first byte of the message, data having data ID "101" at the second byte and data having data ID "201" at the third byte of the message.

In the distribution apparatus 2a having the configuration described above, the control section 20 extracts data ID and data values from received data, when data is received from the onboard apparatuses 1a, 1b by the first communication section 24. The control section 20, then, searches data ID columns of the DB 21a for the extracted data ID. When the extracted data ID is found in the data ID columns of the DB 21a, the control section 20 registers the data values extracted from the received data onto the data values column corresponding to this data ID. Thus, the distribution apparatus 2a can sequentially update data values of each data stored by the DB 21a, on the basis of data sequentially sent from the onboard apparatuses 1a, 1b.

The onboard apparatuses 1a, 1b, 1c, 1d, 1e and the distribution apparatuses 2a, 2b, 2c in the present embodiment 1 have synchronized timers. Thus, the onboard apparatuses 1a, 1b, 1c, 1d, 1e and the distribution apparatuses 2a, 2b, 2c in the present embodiment 1 synchronize and perform operations on the basis of shared interval. Hence, the control sections 10 of the onboard apparatuses 1a, 1b, 1c, 1d, 1e and control sections 20 of the distribution apparatuses 2a, 2b, 2c function as timers based on internal clocks (not shown).

Hereinafter, it will be described about process that the control section 20 of the distribution apparatus 2a transmits data or message based on the transmitted information registered by the first transmitted information table 23b or the second transmitted information table 23c. At first, it will be described about process that the control section 20 transmits data based on the transmitted information registered by the first transmitted information table 23b.

The control section 20 of the distribution apparatus 2a times for each distribution interval registered by the first transmitted information table 23b. Every time respective distribution intervals elapse which are registered by the first transmitted information table 23b, the control section 20 reads out corresponding data ID and a corresponding destination from the first transmitted information table 23b. Further, the control section 20 reads out, from the DB 21a, data values of data represented by the read data ID. The control section 20, then, transmits data including data ID and data values from the first communication section 24 to a destination being read out from the first transmitted information table 23b. Therefore, the distribution apparatus 2a can transmit each data at distribution interval for each data to a predetermined destination, based on each transmitted information registered by the first transmitted information table 23b.

Figure 5:
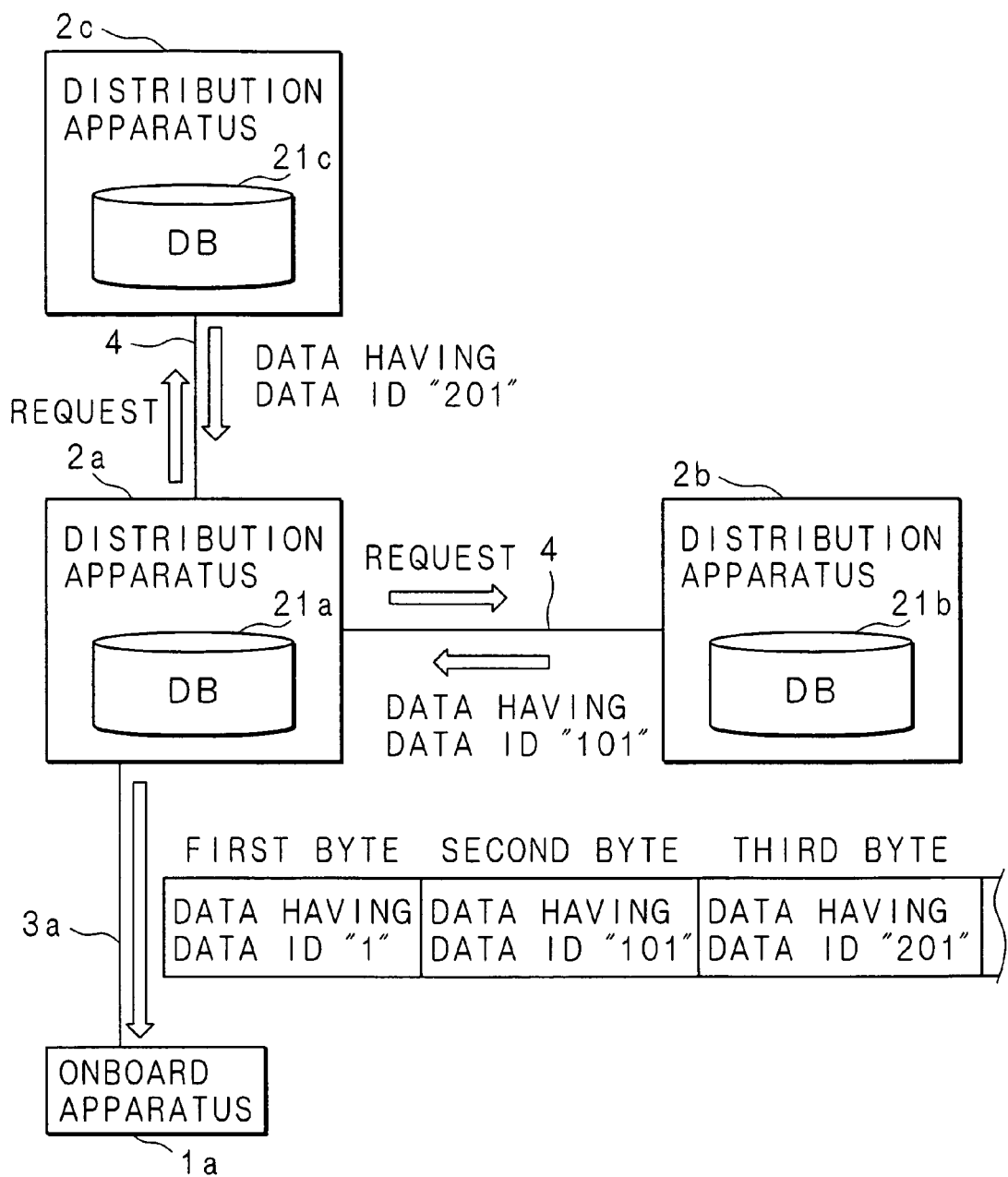
FIG. 5 is an explanation view illustrating a process for transmitting message from a distribution apparatus to an onboard apparatus.

Next, it will be described about process that the control section 20 of the distribution apparatus 2a transmits message based on the transmitted information registered by the second transmitted information table 23c. FIG. 5 is an explanation view illustrating a process for transmitting message from the distribution apparatus 2a to the onboard apparatus 1a. In FIG. 5, the communication line 4 connecting the distribution apparatus 2a to the distribution apparatus 2b is separately shown from the communication line 4 connecting the distribution apparatus 2a to the distribution apparatus 2c, for explanation purposes. However, both the communication lines 4 are single communication line 4. Furthermore, it will be described below about process for transmitting message having message ID "1" registered by the second transmitted information table 23c shown in FIG. 4B.

The control section 20 of the distribution apparatus 2a times for each distribution interval registered by the second transmitted information table 23c. Every time respective distribution intervals elapse which are registered by the second transmitted information table 23c, the control section 20 reads out corresponding message ID, corresponding destination and corresponding data information from the second transmitted information table 23c. Further, the control section (decision means) 20 decides whether there is, in own DB 21a, data having the data ID that is included in the read data information or not.

Specifically, the control section 20 decides that data having this data ID has been stored by own DB 21a, in a case that the management information table 23a registers information representing the distribution apparatus 2a as the apparatus information in association with this data ID included in the read data information. On the other hand, the control section 20 decides that data having this data ID has not been stored by own DB 21a, in a case that the management information table 23a registers information representing another distribution apparatus as the apparatus information in association with this data ID included in the read data information.

When having decided that data having this data ID has been stored by own DB 21a, the control section 20 reads out data values for this data from the DB 21a. When having decided that data having this data ID has not been stored by own DB 21a, the control section 20 identifies another distribution apparatus 2b, 2c having stored this data, on the basis of the apparatus information registered by the management information table 23a in association with this data ID.

In this embodiment, the control section 20 decides that data information being read out from the second transmitted information table 23c includes: data having data ID "1" which has been stored by the DB 21 of the distribution apparatus 2a; data having data ID "101" which has been stored by the distribution apparatus 2b; and data having data ID "201" which has been stored by the distribution apparatus 2c.

Further, the control section (request means) 20 of the distribution apparatus 2a requests for transmission of data (data values) that has data ID "101" and has not been stored by own DB 21a toward the distribution apparatus 2b that has been identified as an apparatus having stored the data having the data ID "101", as shown by a white arrow directed from the distribution apparatus 2a to the distribution apparatus 2b in FIG. 5. Similarly, the control section 20 requests for transmission of data (data values) that has data ID "201" and has not been stored by own DB 21a toward the distribution apparatus 2c that has been identified as an apparatus having stored the data having the data ID "201", as shown by a white arrow directed from the distribution apparatus 2a to the distribution apparatus 2c in FIG. 5.

The control section of distribution apparatus 2b reads out data values corresponding to the data ID "101" from the DB 21b, in accordance with the request from the distribution apparatus 2a, and transmits the read data values with the data ID to the distribution apparatus 2a, as shown by a white arrow directed from the distribution apparatus 2b to the distribution apparatus 2a. Similarly, the control section of distribution apparatus 2c reads out data values corresponding to the data ID "201" from the DB 21c, in accordance with the request from the distribution apparatus 2a, and transmits the read data values with the data ID to the distribution apparatus 2a, as shown by a white arrow directed from the distribution apparatus 2c to the distribution apparatus 2a. Therefore, the control section 20 of the distribution apparatus 2a can obtain data that have not been stored by own DB 21a from another distribution apparatuses 2b, 2c.

When having obtained data values for all data ID included in the data information read out from the second transmitted information table 23c as described above, the control section 20 of the distribution apparatus 2a creates message based on the data information. Specifically, the control section 20 puts data ID and corresponding data values at corresponding position represented by the data information, in order to create single message. The control section 20, then, adds message ID being read out from the second transmitted information table 23c onto the created message, and transmits the created message with added message ID from the first communication section 24 to a destination being read out from the second transmitted information table 23c.

In this embodiment, the distribution apparatus 2a transmits to the onboard apparatus 1a the message that includes: data (data ID and data values) having data ID "1" at the first byte; data (data ID and data values) having data ID "101" at the second byte and data (data ID and data values) having data ID "201" at the third byte, as shown by a white arrow directed from the distribution apparatus 2a to the onboard apparatus 1a. It is not required to put anything on the data region outside the region from the first byte to the third byte of the message. The distribution apparatus 2a can distribute all data included in each message at corresponding distribution interval to predetermined destinations, on the basis of each transmitted information registered by the second transmitted information table 23c, as described above.

It should be noted that the present invention is not limited to utilizing a method that searches the management information table 23a as described above for the decision whether own DB 21a has stored each data included in the data information being read out from the second transmitted information table 23c or not. For example, the control section 20 may decide that data has not registered by the DB 21a, in a case that the control section 20 fails to read out data values of the data represented by data ID that is included in read data information from the DB 21a when having tried to read out the data values from the DB 21a.

As described above, each of the distribution apparatuses 2a, 2b, 2c can obtain data from other distribution apparatuses 2a, 2b, 2c before distributing, even in a case that the data has not been stored by own DB 21a, 21b, 21c when each of the distribution apparatuses 2a, 2b, 2c tries to transmit message including a plurality of data with such the un-stored data. Thus, the distribution apparatuses 2a, 2b, 2c are not required to hold all data required by connected onboard apparatuses 1a, 1b, 1c, 1d, 1e. Therefore, it is possible to reduce amounts of data stored by the DBs 21a, 21b, 21c.

For the reasons described above, the onboard apparatuses 1a, 1b, 1c, 1d, 1e can obtain all required data from the distribution apparatuses 2a, 2b, 2c connected to the onboard apparatuses, even when the required data includes data that is not transmitted between the distribution apparatuses 2a, 2b, 2c and the onboard apparatuses 1a, 1b, 1c, 1d, 1e during a normal operation of the system of the in-vehicle communication system, e.g., data that is required to be transmitted between the distribution apparatuses 2a, 2b, 2c and the onboard apparatuses 1a, 1b, 1c, 1d, 1e in response to an operation based on an instruction of a passenger in the car.

The distribution apparatuses 2a, 2b, 2c can not only distribute message including a plurality of data to the onboard apparatuses 1a, 1b, 1c, 1d, 1e on the basis of the registration contents of the second transmitted information table as described above, but also can distribute message including a plurality of data in response to requests of the onboard apparatuses 1a, 1b, 1c, 1d, 1e.

Specifically, the onboard apparatuses 1a, 1b, 1c, 1d, 1e send transmission requests of required data to own connected distribution apparatuses 2a, 2b, 2c, in a case that the onboard apparatuses 1a, 1b, 1c, 1d, 1e happen to require a plurality of data in response to an operation based on an instruction of a passenger in the car. The control sections 20 of the distribution apparatuses 2a, 2b, 2c decide whether each data has been stored by own DBs 21a, 21b, 21c or not, in accordance with the transmission request sent from the onboard apparatuses 1a, 1b, 1c, 1d, 1e. When data has been stored by own DBs, the control sections 20 read out the data from own DBs 21a, 21b, 21c. When data has not been stored by own DBs, the control sections obtain the data from other distribution apparatuses 2a, 2b, 2c. The control sections 20 of the distribution apparatuses 2a, 2b, 2c, then, create message including data being read out from own DBs 21a, 21b, 21c and data obtained from other distribution apparatuses 2a 2b, 2c, and distribute the created message to the onboard apparatuses 1a, 1b, 1c, 1d, 1e.

Therefore, the onboard apparatuses 1a, 1b, 1c, 1d, 1e can obtain all required data from the distribution apparatuses 2a, 2b, 2c, even when the required data includes data that is not transmitted between the distribution apparatuses 2a, 2b, 2c and the onboard apparatuses 1a, 1b, 1c, 1d, 1e during a normal operation of the system of the in-vehicle communication system.

Figure 6:
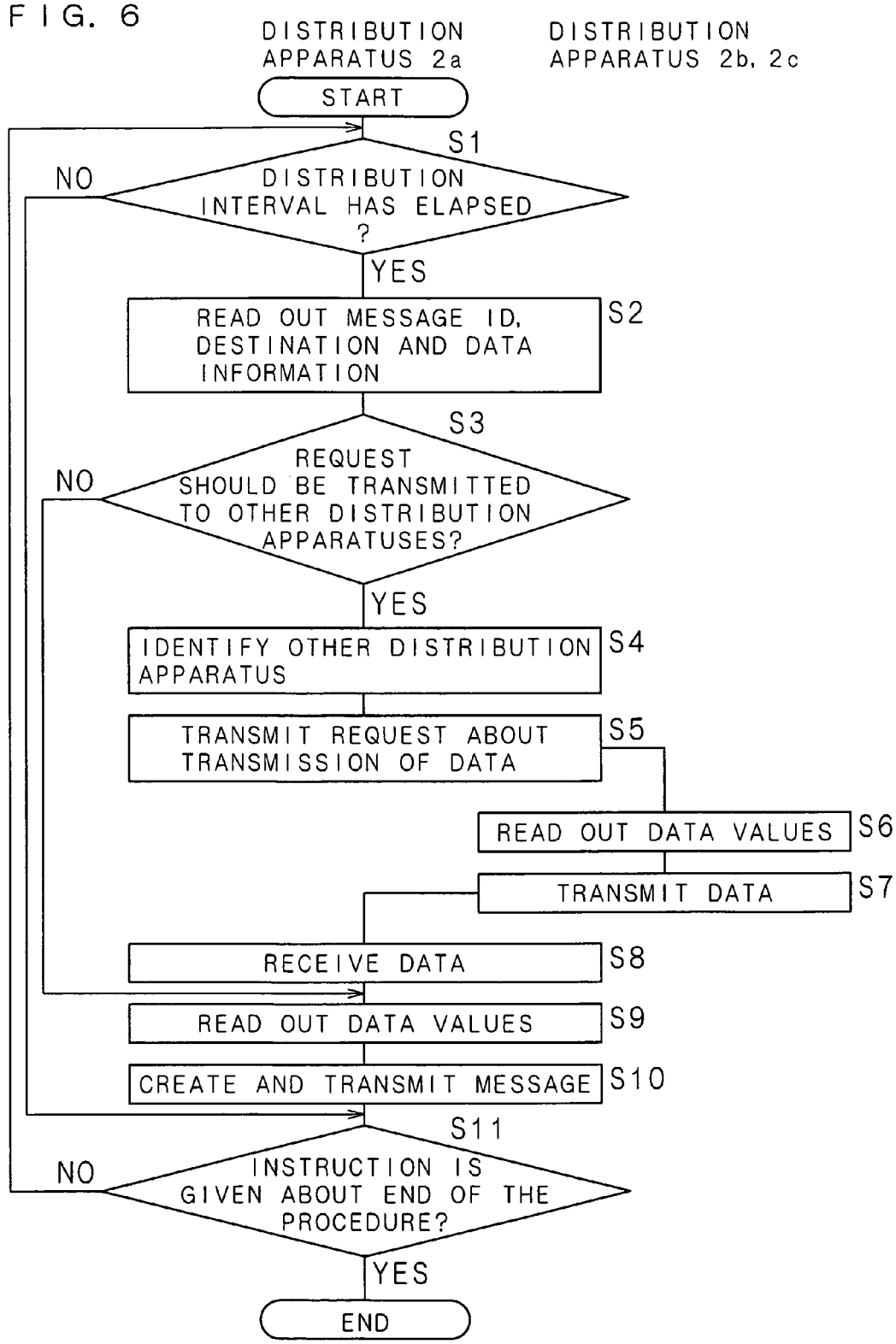
FIG. 6 is a flowchart showing a procedure about distribution process.

Hereinafter, it will be described on the basis of a flowchart about message distribution process performed by the distribution apparatus 2a in accordance with registration contents of the second transmitted information table 23c. FIG. 6 is a flowchart showing a procedure about distribution process. The distribution apparatuses 2b, 2c also perform similar processes. Thus, the processes of the distribution apparatuses 2b, 2c will not be described in detail.

The control section 20 of the distribution apparatus 2a functions as a timer and decides whether any of respective distribution intervals elapses which are registered by the second transmitted information table 23c or not (S1). When having decided that any distribution intervals do not elapse which are registered by the second transmitted information table 23c (S1: NO), the control section 20 proceeds the procedure to step S11.

When having decided that a distribution interval does elapse which are registered by the second transmitted information table 23c (S1: YES), the control section 20 reads out corresponding message ID, corresponding destination and corresponding data information from the second transmitted information table 23c (S2). The control section 20, then, decides whether own DB 21a has stored data having the data ID that is included in the read data information or not, and whether data transmission request should be transmitted to other distribution apparatuses 2b, 2c or not (S3).

When having decided that data transmission request should not be transmitted to other distribution apparatuses 2b, 2c (S3: NO), the control section 20 proceeds the procedure to step S9. When having decided that data transmission request should be transmitted to other distribution apparatuses 2b, 2c (S3: YES), the control section 20 identifies other distribution apparatus 2b, 2c to be requested about data transmission (S4), and transmits request about transmission of data that has not been stored by the own DB 21a toward the identified other distribution apparatus 2b, 2c (S5).

The control section of the identified other distribution apparatus 2b, 2c reads out corresponding data values form own DB 21b, 21c in accordance with the request transmitted from the distribution apparatus 2a (S6), and transmits data including the read data values and data ID to the distribution apparatus 2a (S7). The control section 20 of the distribution apparatus 2a receives data transmitted from the identified other distribution apparatus 2b, 2c (S8), and temporally stores the data on the storage section 23.

The control section 20 of the distribution apparatus 2a reads out, from the DB 21a, data values of data that has the data ID included in the data information being read out at the step S2 and has been stored by the own DB 21a (S9). The control section 20 creates message, based on the data information being read out at the step S2, that includes the data received from the identified other distribution apparatus 2b, 2c at the step S8 and the data being read out from the own DB 21a at the step S9. The control section 20, then, transmits the created message to the onboard apparatus 1a that is the destination being read out at the step S2 (S10).

The control section 20 decides whether an instruction is given about end of the procedure or not (S11), for example, in a case that the power supply circuit 22 has ended power supply. When the instruction is given about the end of the procedure (S11: YES), the control section 20 completes the procedure described above. When the instruction is not given about the end of the procedure (S11: NO), the control section 20 returns the procedure to the step S1 and repeats the processes described above until the instruction has been given about the end of the procedure.

Embodiment 2

Hereinafter, an in-vehicle Communication System According to the present invention is described in detail with reference to drawings illustrating an in-vehicle communication system in an embodiment 2. The in-vehicle communication system in the embodiment 2 has a similar configuration to the in-vehicle communication system in the embodiment 1. Thus, it will not be described in detail about the configuration of the in-vehicle communication system in the embodiment 2.

In the in-vehicle communication system of the present embodiment 2, the storage sections 23 of the distribution apparatus 2a, 2b, 2c store second transmitted information tables 23c as shown in FIG. 7A and relay information tables as shown in FIGS. 7B and 7C, as well as the DB 21a as shown in FIG. 3A and the first transmitted information table 23b as shown in FIG. 4A. It is not required to store the management information table 23a on the storage sections 23 of the distribution apparatuses 2a, 2b, 2c in the present embodiment 2, although the management information table 23a is stored on the storage section 23 of the distribution apparatus 2a in the embodiment 1 described above.

FIG. 7A, FIG. 7B and FIG. 7C are schematic views showing registration contents of second transmitted information table 23c and relay information tables. As shown in FIG. 7A, the second transmitted information table (distribution storage means) 23c in the present embodiment 2 registers in association with one another: message ID for identifying each message; distribution interval for distributing each message; destination for distributing each message; and data information for representing data included in each message, as transmitted information of each message transmitted from the distribution apparatuses 2a, 2b, 2c to the onboard apparatuses 1a, 1b, 1c, 1d, 1e.

As shown in FIG. 7B and FIG. 7C, the relay information tables (distribution information storage means) registers in association with one another: message ID for identifying each message; destination for distributing each message; and data information for representing data included in each message, as transmitted information of each message received from other distribution apparatuses 2a, 2b, 2c and transmitted to other distribution apparatuses 2a, 2b, 2c or to the onboard apparatuses 1a, 1b, 1c, 1d, 1e. In the transmitted information table 23c and relay information tables shown in FIG. 7A, FIG. 7B and FIG. 7C, numerals "1a", "2a" and "2b" are registered as information representing onboard apparatus 1a or the distribution apparatuses 2a, 2b selected as destinations in columns of destination. However, it is not limited to information representing the onboard apparatus and the distribution apparatuses for the information about the destination. It may be utilized information representing the communication line within the car for the information about the destination.

Figure 8:
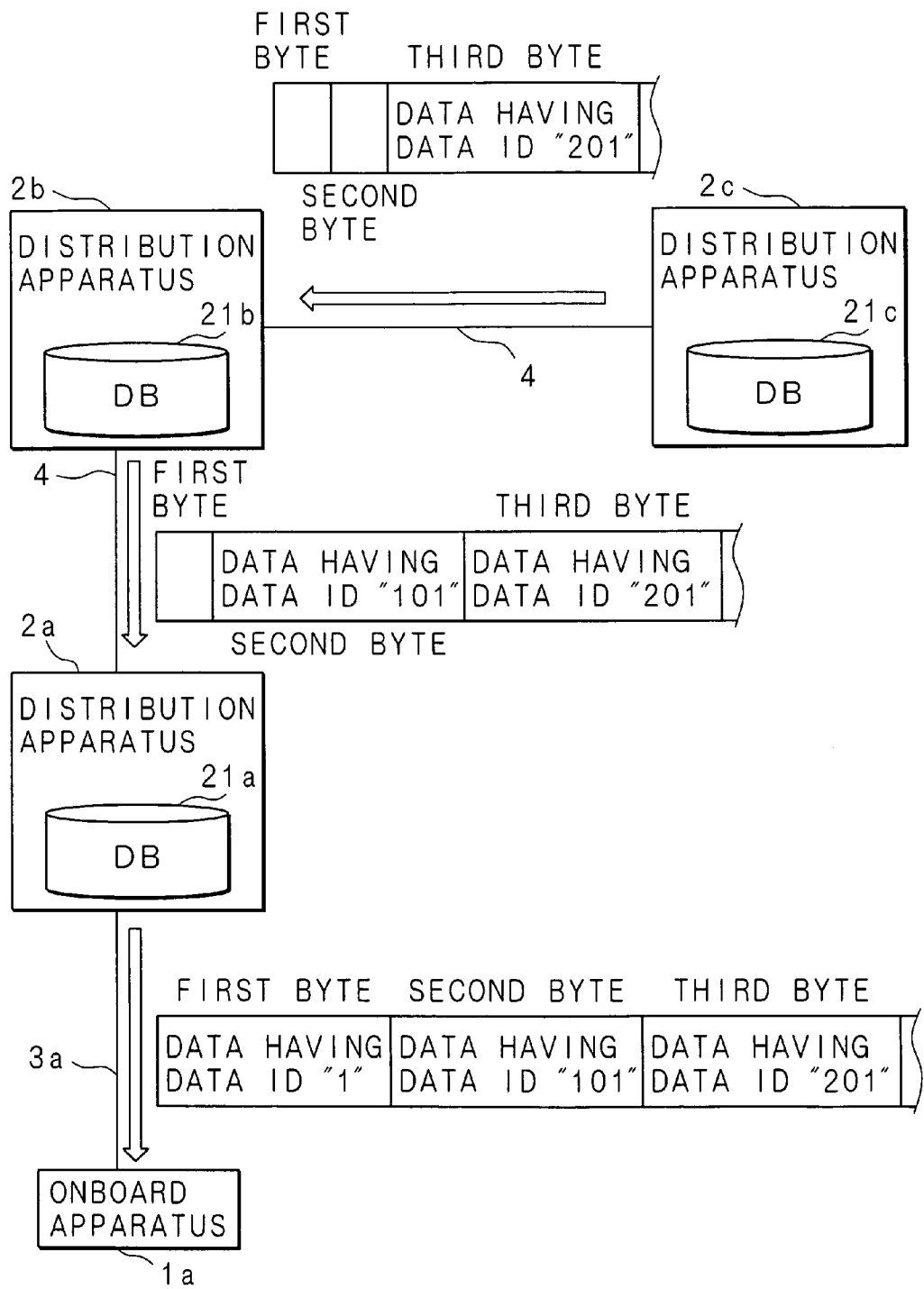
FIG. 8 is an explanation view illustrating a process for transmitting message from a distribution apparatus to an onboard apparatus.

Hereinafter, it will be described about second transmitted information table 23c shown in FIG. 7A in the context of the table 23c stored by storage section 23 of the distribution apparatus 2c, relay information table shown in FIG. 7B in the context of the table stored by the storage section of the distribution apparatus 2b and about relay information table shown in FIG. 7C in the context of the table stored by the storage section of the distribution apparatus 2a. FIG. 8 is an explanation view illustrating a process for transmitting message from the distribution apparatus 2a to the onboard apparatus 1a. In FIG. 8, the communication line 4 connecting the distribution apparatus 2a to the distribution apparatus 2b is separately shown from the communication line 4 connecting the distribution apparatus 2b to the distribution apparatus 2c, for explanation purposes. However, both the communication lines 4 are single communication line 4.

In the distribution apparatus 2c having stored the second transmitted information table 23c shown in FIG. 7A on the storage section, the control section times for each distribution interval registered by the second transmitted information table 23c. Every time respective distribution intervals elapse which are registered by the second transmitted information table 23c, the control section reads out corresponding message ID, corresponding destination and corresponding data information from the second transmitted information table 23c. The control section of the distribution apparatus 2c, then, reads out data values corresponding to the data ID included in the read data information from the DB 21c, and puts the read data values and data including data ID onto the position represented by the data information, in order to create single message. Further, the control section of the distribution apparatus 2c adds message ID being read out from the second transmitted information table 23c onto the created message, and transmits the created message with added message ID from the first communication section 24 or the second communication section 25 to a destination being read out from the second transmitted information table 23c.

In this embodiment, the distribution apparatus 2c transmits to the distribution apparatus 2b the message that includes data (data ID and data values) having data ID "201" at the third byte and is provided with message ID "1", as shown in FIG. 8 by a white arrow directed from the distribution apparatus 2c to the distribution apparatus 2b. It is not required to put anything on the data region outside the region at the third byte of the message. The distribution apparatus 2c can distribute each message at a corresponding distribution interval to predetermined destinations, on the basis of each transmitted information registered by the second transmitted information table 23c, as described above.

In the distribution apparatus 2b having stored the relay information table shown in FIG. 7B on the storage section, the control section reads out a destination and data information corresponding to the message ID "1" from the relay information table, when receiving message having message ID "1" from the distribution apparatus 2c. The control section of the distribution apparatus 2b reads out data values corresponding to the data ID included in the read data information from the DB 21b, and puts the read data values and data including data ID onto the position represented by the data information in the message received from the distribution apparatus 2c, in order to change the message. The control section of the distribution apparatus 2b, then, transmits the message with the put data from the first communication section 24 or the second communication section 25 to the destination being read out from the relay information table.

In this embodiment, the distribution apparatus 2b transmits to the distribution apparatus 2a the message that includes data (data ID and data values) having data ID "101" at the second byte and data (data ID and data values) having data ID "201" at the third byte and is provided with message ID "1", as shown in FIG. 8 by a white arrow directed from the distribution apparatus 2b to the distribution apparatus 2a. It is not required to put anything on the data region outside the region at the second and the third byte of the message. The distribution apparatus 2b can add data having been stored by the DB 21b onto the message transmitted with each message ID, and can transmit the message with the added data to predetermined destinations, on the basis of transmitted information registered by the relay information table, as described above.

In the distribution apparatus 2a having stored the relay information table shown in FIG. 7C on the storage section, the control section 20 reads out a destination and data information corresponding to the message ID "1" from the relay information table, when receiving message having message ID "1" from the distribution apparatus 2b. The control section 20 of the distribution apparatus 2a reads out data values corresponding to the data ID included in the read data information from the DB 21a, and puts the read data values and data including data ID onto the position represented by the data information in the message received from the distribution apparatus 2b, in order to change the message. The control section 20 of the distribution apparatus 2a, then, transmits the message with the put data from the first communication section 24 or the second communication section 25 to the destination being read out from the relay information table.

In this embodiment, the distribution apparatus 2a transmits to the onboard apparatus 1a the message that includes: data (data ID and data values) having data ID "1" at the first byte; data (data ID and data values) having data ID "101" at the second byte and data (data ID and data values) having data ID "201" at the third byte and is provided with message ID "1", as shown in FIG. 8 by a white arrow directed from the distribution apparatus 2a to the onboard apparatus 1a. It is not required to put anything on the data region outside the region from the first byte to the third byte of the message. The distribution apparatus 2*a* can add data having been stored by the DB 21*a* onto the message transmitted with each message ID, and can transmit the message with the added data to predetermined destinations, on the basis of transmitted information registered by the relay information table, as described above.

As described above, the distribution apparatuses 2*a*, 2*b*, 2*c* can create and transmit message or can transmit (transfer) received message with additional data, on the basis of registration contents of the second transmitted information table 23*c* or the relay information tables. Therefore, the onboard apparatuses 1*a*, 1*b*, 1*c*, 1*d*, 1*e* can obtain data having been stored by the distribution apparatuses 2*a*, 2*b*, 2*c* at the distribution intervals previously having been set by the second transmitted information table 23*c*.

Further, it is possible to reduce amounts of data transmitted among the distribution apparatuses 2*a*, 2*b*, 2*c* or between the distribution apparatuses 2*a*, 2*b*, 2*c* and the onboard apparatuses 1*a*, 1*b*, 1*c*, 1*d*, 1*e*, by previously setting the registration contents of the second transmitted information table 23*c* or the relay information tables stored by the storage sections 23 of the distribution apparatuses 2*a*, 2*b*, 2*c*, on the basis of distribution paths that are for efficiently distributing data from the distribution apparatuses 2*a*, 2*b*, 2*c* to the onboard apparatuses 1*a*, 1*b*, 1*c*, 1*d*, 1*e*, in consideration of connection conditions of the distribution apparatuses 2*a*, 2*b*, 2*c*.

The registration contents of the second transmitted information table 23*c* and the relay information tables as described above may be registered not only previously but also in response to requests of the onboard apparatuses 1*a*, 1*b*, 1*c*, 1*d*, 1*e*. Specifically, make the onboard apparatuses 1*a*, 1*b*, 1*c*, 1*d*, 1*e* know each data having been stored by the storage sections 23 of the distribution apparatuses 2*a*, 2*b*, 2*c*. Make the onboard apparatuses 1*a*, 1*b*, 1*c*, 1*d*, 1*e* decide from which distribution apparatus 2*a*, 2*b*, 2*c* data should be obtained and decide a path among the distribution apparatuses 2*a*, 2*b*, 2*c* transmitting each data when the onboard apparatuses 1*a*, 1*b*, 1*c*, 1*d*, 1*e* happen to require a plurality of data, for example, in response to an operation based on an instruction of a passenger in the car. Additionally, make the onboard apparatuses 1*a*, 1*b*, 1*c*, 1*d*, 1*e* send the transmitted information as shown in FIG. 7A, FIG. 7B and FIG. 7C to the distribution apparatuses 2*a*, 2*b*, 2*c*, and make the control sections 20 of the distribution apparatuses 2*a*, 2*b*, 2*c* register the received transmitted information on the second transmitted information table 23*c* or the relay information tables.

Therefore, the onboard apparatuses 1*a*, 1*b*, 1*c*, 1*d*, 1*e* can obtain all required data from the distribution apparatuses 2*a*, 2*b*, 2*c*, even when the required data includes data that is not transmitted between the distribution apparatuses 2*a*, 2*b*, 2*c* and the onboard apparatuses 1*a*, 1*b*, 1*c*, 1*d*, 1*e* during a normal operation of the system of the in-vehicle communication system. While the onboard apparatuses 1*a*, 1*b*, 1*c*, 1*d*, 1*e* are described above to create transmitted information registered by the second transmitted information table 23*c* and the relay information tables, the distribution apparatuses 2*a*, 2*b*, 2*c* may create transmitted information as shown in FIG. 7A, FIG. 7B and FIG. 7C after receiving data transmission requests from the onboard apparatuses 1*a*, 1*b*, 1*c*, 1*d*, 1*e* and the created transmitted information may be registered by the second transmitted information table 23*c* or the relay information tables of the distribution apparatuses 2*a*, 2*b*, 2*c*.

Figure 9:
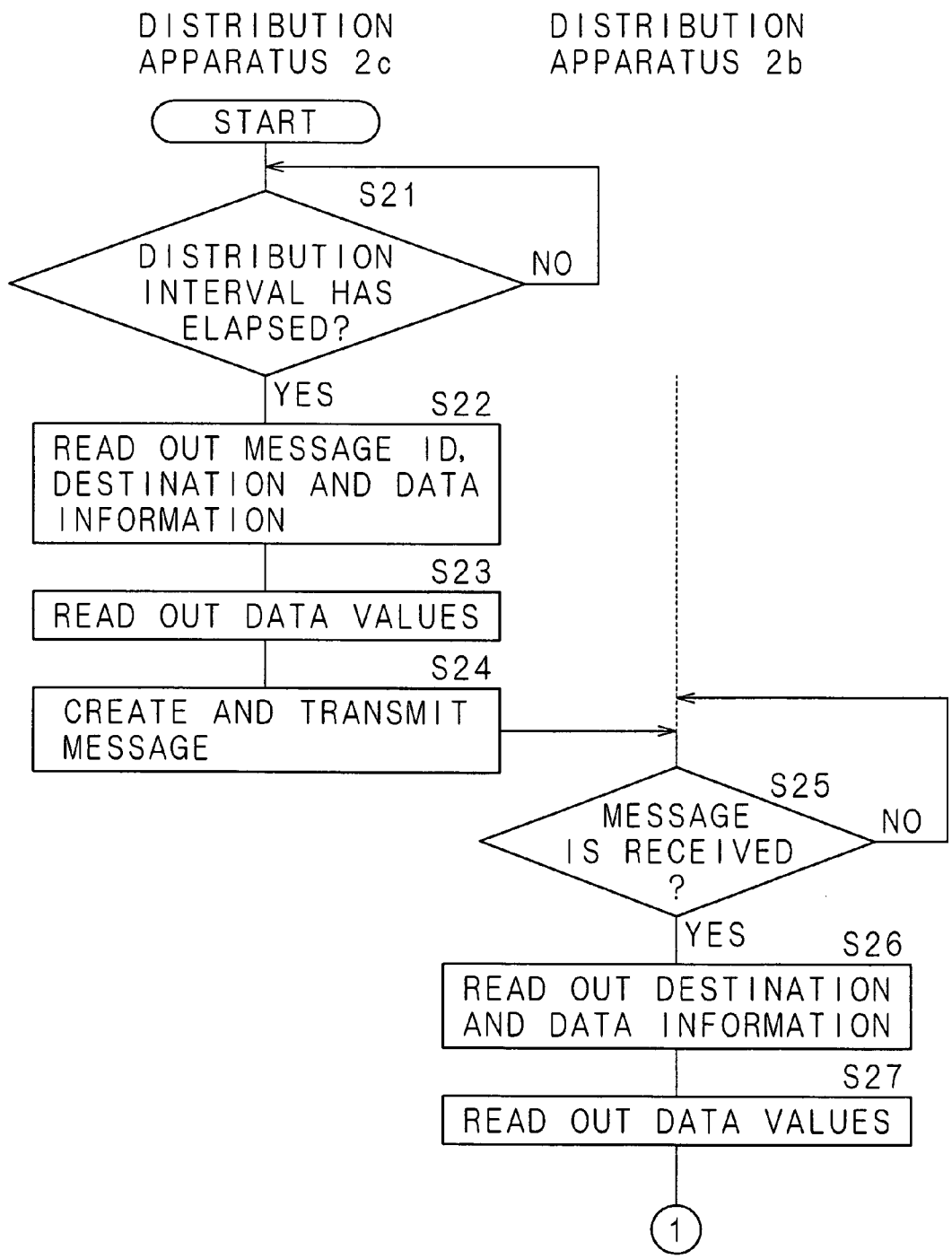
FIG. 9 is a flowchart showing a procedure about distribution process.
Figure 10:
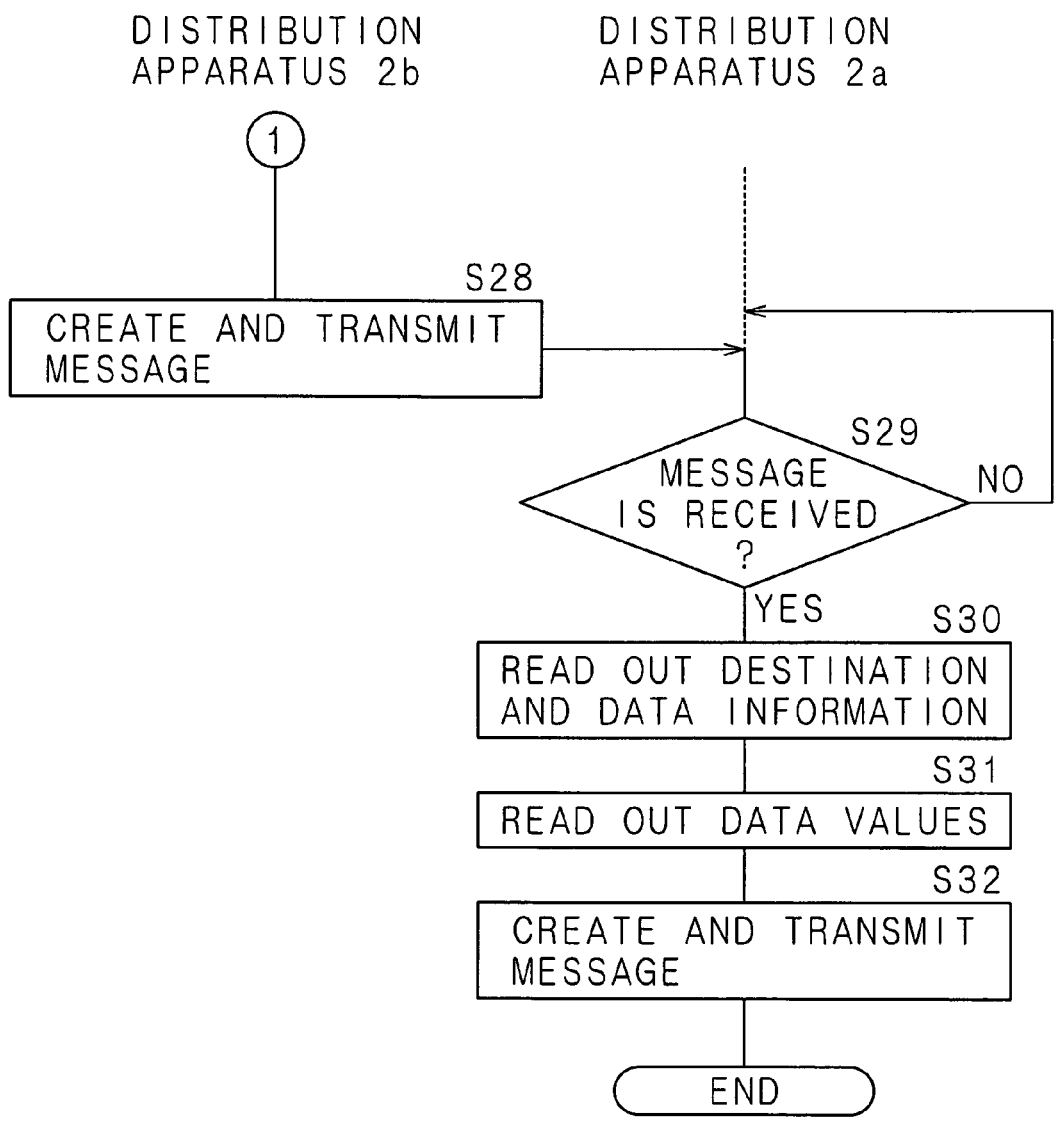
FIG. 10 is a flowchart showing a procedure about distribution process.

Hereinafter, it will be described about message distribution process based on the registration contents of the second transmitted information table 23*c* or the relay information tables of the distribution apparatuses 2*a*, 2*b*, 2*c*, with reference to flowcharts. FIG. 9 and FIG. 10 are flowcharts showing procedures about distribution process performed by the distribution apparatuses 2*a*, 2*b*, 2*c*. Hereinafter, it will be described about second transmitted information table 23*c* shown in FIG. 7A in the context of the table 23*c* stored by storage section 23 of the distribution apparatus 2*c*, relay information table shown in FIG. 7B in the context of the table stored by the storage section of the distribution apparatus 2*b* and about relay information table shown in FIG. 7C in the context of the table stored by the storage section of the distribution apparatus 2*a*, as described above. It should be noted that the distribution apparatuses 2*a*, 2*b*, 2*c* performs processes based on the registration contents of the second transmitted information table 23*c* or the relay information tables, as described above.

The control section of the distribution apparatus 2*c* functions as a timer and decides whether any of respective distribution intervals elapses which are registered by the second transmitted information table 23*c* or not (S21). When having decided that any distribution intervals do not elapse (S21: NO), the control section of the distribution apparatus 2 waits with performing processes during a normal operation.

When having decided that a distribution interval elapse (S1: YES), the control section of the distribution apparatus 2*c* reads out corresponding message ID, corresponding destinations and corresponding data information from the second transmitted information table 23*c* (S22). Then, the control section of the distribution apparatus 2*c* reads out, from the DB 21*c*, data values corresponding to the data ID included in the read data information (S23), and creates message, based on the data information being read out at the step S22, which includes the read data values and data ID. Additionally, the control section of the distribution apparatus 2*c* transmits the created message to the distribution apparatus 2*b* that is the destination being read out at the step S22 (S24).

The control section of the distribution apparatus 2*b* repeatedly decides whether receiving message from the distribution apparatus 2*c* or not (S25). When having received no message (S25: NO), the control section of the distribution apparatus 2*b* waits with performing processes during a normal operation. When having received message from the distribution apparatus 2*c* (S25: YES), the control section of the distribution apparatus 2*b* reads out, from the relay information table, destination and data information corresponding to the message ID provided to the received message (S26). Then, the control section of the distribution apparatus 2*b* reads out, from the DB 21*b*, data values corresponding to the data ID included in the read data information (S27). The control section of the distribution apparatus 2*b* adds the read data values and the data ID onto the message received from the distribution apparatus 2*c*, on the basis of the data information being read out at the step S26, in order to create message. The control section of the distribution apparatus 2*b*, then, transmits the created message to the distribution apparatus 2*a* that is the destination being read out at the step S26 (S28).

The control section of the distribution apparatus 2*a* repeatedly decides whether receiving message from the distribution apparatus 2*b* or not (S29). When having received no message (S29: NO), the control section of the distribution apparatus 2*b* waits with performing processes during a normal operation. When having received message from the distribution apparatus 2*b* (S29: YES), the control section of the distribution apparatus 2*a* reads out, from the relay information table, destination and data information corresponding to the message ID provided on the received message (S30). Then, the control section 20 of the distribution apparatus 2*a* reads out, from the DB 21*a*, data values corresponding to the data ID included in the read data information (S31). The control section 20 of the distribution apparatus 2a adds the read data values and the data ID onto the message received from the distribution apparatus 2b, on the basis of the data information being read out at the step S30, in order to create message. The control section 20 of the distribution apparatus 2a, then, transmits the created message to the onboard apparatus 1a that is the destination being read out at the step S30 (S32). Therefore, the onboard apparatus 1a can obtain all data having been stored by the distribution apparatuses 2a, 2b, 2c.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are intended to be embraced by the claims.

The invention claimed is:

1. An in-vehicle communication system, comprising
a plurality of gateway apparatuses: and
a plurality of electronic control units that are connected to the plurality of gateway apparatuses and receive data distributed from the plurality of gateway apparatuses, wherein
each gateway apparatus comprises:
    a storage section that stores data;
    a distribution section that distributes data to an electronic control unit;
    a transmission section that transmits data to another gateway apparatus;
    a receiving section that receives data from another distribution apparatus;
    a decision section that performs a decision whether there is data to be distributed or not, on the storage section;
    a readout section that reads out data from the storage section wherein, when the decision section has decided that there is data on the storage section to be distributed, the readout section reads out only required data to be distributed; and
    a request section that requests a data transmission wherein, when the decision section has decided that there is not data to be distributed on the storage section of its respective gateway apparatus, but there is data on the storage section of another gateway apparatus to be distributed, the request section requests a data transmission from the gateway apparatus where the data is stored,
    wherein the distribution section distributes only the required data being read out by the readout section and/or data received by the receiving section.

2. An in-vehicle communication system according to claim 1, wherein
each electronic control unit comprises a data transmission request section that sends a data transmission request to own connected gateway apparatus,
each gateway apparatus further comprises a transmission request receiving section that receives the data transmission request sent from the data transmission request section, and
the data to be distributed for the decision performed by the decision section is represented by the data transmission request that is received by the transmission request receiving section.

3. An in-vehicle communication system according to claim 1, wherein
each gateway apparatus further comprises:
    an apparatus information storage section that stores, in association with each other, identification information for identifying data and gateway apparatus information for representing a gateway apparatus having stored data identified by the identification information; and
    an identification section that identifies a gateway apparatus having stored the data to be distributed for the decision performed by the decision section, on the basis of storage contents of the apparatus information storage section, and
the request section requests the data transmission to the gateway apparatus identified by the identification section.

4. An in-vehicle communication system according to claim 1, wherein
the plurality of electronic control units are connected via serial buses to the plurality of gateway apparatuses.

5. An in-vehicle communication system according to claim 1, wherein
the distribution section repeats data distribution.

6. An in-vehicle communication system according to claim 3, wherein
the plurality of electronic control units are connected via serial buses to the plurality of gateway apparatuses.

7. An in-vehicle communication system according to claim 4, wherein
the serial buses are based on a standard of controller-area network.

8. An in-vehicle communication system according to claim 6, wherein
the serial buses are based on a standard of controller-area network.

9. An in-vehicle communication system according to claim 8, wherein
the distribution section repeats data distribution.

10. An in-vehicle communication system, comprising:
a plurality of gateway apparatuses: and
a plurality of electronic control units that are connected to the plurality of gateway apparatuses and receive data distributed from the plurality of gateway apparatuses, wherein
each gateway apparatus comprises:
    a storage section that stores data;
    a distribution section that distributes data to another gateway apparatus or an electronic control unit;
    a receiving section that receives data from another gateway apparatus;
    a distribution information storage section that stores, in association with each other, data identification information for identifying data, destination information for representing a destination to which the data identified by the data identification information is distributed, and additional information for representing additional data to be added onto the data identified by the data identification information when the data identified by the data identification information is distributed;
    an addition section that adds additional data having been stored by the storage section to the data received by the receiving section, on the basis of storage contents of the distribution information storage section; and an identification section that identifies a destination to which the data received by the receiving section is distributed, wherein the distribution section distributes only required data received by the receiving section with the additional data added by the addition section to the destination identified by the identification section.

11. An in-vehicle communication system according to claim 10, wherein each electronic control unit comprises a data transmission request section that sends a data transmission request to own connected gateway apparatus, and each gateway apparatus further comprises:

a transmission request receiving section that receives the data transmission request sent from the data transmission request section; and a change section that changes the storage contents of the distribution information storage section, on the basis of the data transmission request received by the transmission request receiving section.

12. An in-vehicle communication system according to claim 10, wherein the plurality of electronic control units are connected via serial buses to the plurality of gateway apparatuses.

13. An in-vehicle communication system according to claim 10, wherein the distribution section repeats data distribution.

14. An in-vehicle communication system according to claim 11, wherein the plurality of electronic control units are connected via serial buses to the plurality of gateway apparatuses.

15. An in-vehicle communication system according to claim 12, wherein the serial buses are based on a standard of controller-area network.

16. An in-vehicle communication system according to claim 14, wherein the serial buses are based on a standard of controller-area network.

17. An in-vehicle communication system according to claim 16, wherein the distribution section repeats data distribution.

* * * * *